United States Patent [19]

Higgins

[11] 4,110,479

[45] Aug. 29, 1978

[54] METHOD OF PREPARING COLLAGEN STRUCTURES

[75] Inventor: Thomas Engel Higgins, Brookfield, Ill.

[73] Assignee: Union Carbide Corporation, New York, N.Y.

[21] Appl. No.: 783,426

[22] Filed: Mar. 31, 1977

[51] Int. Cl.$^2$ ............................................... A22C 13/00
[52] U.S. Cl. ..................................... 426/277; 426/140
[58] Field of Search ............... 426/135, 138, 140, 277, 426/278, 646, 652

[56] References Cited

U.S. PATENT DOCUMENTS

| | | | |
|---|---|---|---|
| 2,988,451 | 6/1961 | Zahn ..................................... | 426/140 |
| 3,123,480 | 3/1964 | Lieberman ........................ | 426/140 X |
| 3,123,483 | 3/1964 | McKnight ............................. | 426/140 |
| 3,494,772 | 2/1970 | Bradshaw ............................ | 426/277 |
| 3,961,085 | 1/1976 | Winkler et al. .................. | 426/140 X |

*Primary Examiner*—Robert A. Yoncoskie
*Attorney, Agent, or Firm*—David Fink

[57] ABSTRACT

An improved method of preparing shaped collagen structures is provided wherein a shaped collagen structure such as a tubular food casing is treated with a dewatering solution comprising at least about 0.01% by weight of sodium alginate prior to the drying thereof.

24 Claims, No Drawings

METHOD OF PREPARING COLLAGEN STRUCTURES

The present invention relates to a method for producing formed collagen structures and more particularly to an improved method for preparing collagen products such as tubular food casings wherein a dewatering agent is used to treat the collagen structure before the final drying step.

For a number of years, products prepared from processed animal collagen in tubular, film, and strand form have been manufactured and used in commercial quantities. Collagen products generally obtained by the extrusion of formable compositions into tubular structures have been used as food casings in the processing of food products such as pork sausages and the like.

In the manufacture of collagen products such as tubular food casings, a typical process involves extrusion of a continuous length of collagen material that is generally conveyed through a series of liquid treatment baths including a plasticizing bath, and then dried and sized, generally by hot air means. The dried tubing may be subsequently shirred and compressed to obtain short lengths thereof, commonly called shirred casing sticks. For example, in U.S. Pat. Nos. 3,123,482 and 3,413,129 to Lieberman; U.S. Pat. Nos. 3,123,483 and 3,235,641 to McKnight; and U.S. Pat. No. 3,446,633 to Talty are disclosed various processes that may be used in the preparation of collagen tubing from low collagen solids compositions and, alternatively, in U.S. Pat. Nos. 3,551,535 and 3,782,977 to Henderson et al are disclosed processes that may be employed in the preparation of such tubing from collagen composition having high collagen solids content.

Drying of the processed collagen tubing before storage and/or shirring is an essential and key step which is usually carried out in hot air driers with the tubing in an inflated condition. The equipment employed is expensive, requiring a substantial capital investment, and drier capacity generally determines maximum production line speed. Heretofore, methods other than hot air drying have been suggested for the removal of water during the preparation of various types of collagen products, among which are, for example, freezing, (U.S. Pat. No. 3,136,682); tanning agents, (U.S. Pat. Nos. 2,246,236, 2,750,251 and 3,223,551); dialysis and pressure, (U.S. Pat. No. 2,838,363); and pH adjustment, (U.S. Pat. No. 3,223,551). Treatments postulated to remove water by pH adjustment (U.S. Pat. No. 3,223,551) involve distilled water extraction, (U.S. Pat. No. 2,838,363); ketone and alcohol extraction, (U.S. Pat. Nos. 2,115,648, 2,934,447, 3,408,916 and 3,622,353); and buffer salts. It has also been disclosed, for example, in U.S. Pat. No. 3,346,402 to Lieberman, that the addition of carboxymethyl cellulose to the aqueous glycerol bath generally used as a plasticization treatment for tubular collagen casings prior to drying, has the effect of reducing the moisture content in the collagen tubing.

The need still exists, however, for the development of even further improvements in the processing of collagen products such as tubular food casings, sheet, strands and the like, particularly when such improvements realize a reduction in cost or time without adversely affecting other aspects of the process or properties of the products produced thereby.

In accordance with the present invention, it has been discovered that when collagen containing structures are treated with relatively small amounts of the sodium salt of alginic acid, preferably in the form of an aqueous solution, prior to the drying thereof, water will be partially withdrawn from the collagen structure. This dewatering effect can be used to reduce the moisture content of the collagen structure entering the drying equipment thereby reducing the requirements therefor with a resultant reduction in the cost of such equipment or permitting an increase in the process line production speed.

Collagen structures that may be treated can be prepared by any of the methods known in the art using collagen tissues obtained from a variety of raw materials as, for example, limed and unlimed animal hide splits and tendon.

Sodium alginates, which are sodium salts of alginic acid, are known materials available commercially in various viscosity grades. Thus, for example, various viscosity grades of sodium alginates are available from the Kelco Company under the trade designations KELCOGEL and KELGIN.

Dewatering shaped collagen structures in accordance with the present invention can be accomplished by using any one of a number of methods for applying a sodium alginate dewatering agent, preferably in the form of an aqueous solution, to a surface of the wet collagen structure. Thus, for example, the collagen structure may be passed through a dip treatment bath comprising an aqueous solution of sodium alginate in concentrations to be more fully discussed hereinafter prior to advancing to the drying chamber. A preferred and particularly advantageous method comprises passing a collagen structure through an aqueous dip treatment bath, such as the aqueous glycerol plasticizing bath that is generally employed in the processing of collagen structures such as tubular food casings, and in which has also been incorporated the amount herein described of sodium alginate dewatering agent.

Aqueous dewatering solutions suitable for use in accordance with the practice of the invention comprise at least about 0.01% and preferably at least about 0.5% by weight of sodium alginate. The concentration of sodium alginate can vary over a wide range and the upper limit is not critical being determined generally by economic considerations or such other factors as, for example, the viscosity of the solution, the composition of the bath and whether it is also used to concurrently provide other forms of treatment for the collagen structure, the process line speed that is desired, and the like. However, sodium alginate concentrations greatly in excess of about 10% by weight may unduly increase the viscosity of the solution and/or blocking tendencies of collagen tubing and concentrations in excess of about 4% by weight is not generally needed to impart the desired dewatering of collagen structures.

Suitable dewatering treatment solutions of the present invention may also contain other ingredients and preferred embodiments thereof may be prepared with any one of the polyols known in the art as being suitable for use as a plasticizer for various collagen structures. The concentration of such polyol plasticizer component in the aqueous treatment solution generally depends on the concentration generally required for plasticization of the collagen structure. For example, if a polyol plasticizer such as glycerol is to be used, the concentration thereof should be about 2% by weight up to about 30% by weight and preferably up to about 10% by weight.

The pH of the dewatering treatment solution is important, it being essential that the pH of the bath is maintained at a level where the collagen material does not swell. The pH of the treatment bath should therefore be maintained within the range of a pH about 4 to about a pH of 10.

The temperature of the dewatering bath is also important and should generally be above the freezing point of the solution but below 40° C., the temperature at which thermal degradation of collagen may occur. Preferably, the temperature of the bath should be maintained at a temperature below about 25° C. to inhibit microbial spoilage of the dewatering solution.

The viscosity of a dewatering treatment bath may be varied over a wide range and the upper and lower viscosity limits therefore are not critical. However, when processing collagen articles such as tubular food casings it is generally desired that the bath viscosity be maintained as low as possible to enable the ready advance therethrough of the collagen tubing. In general, the viscosity of the dewatering treatment bath can be about 1 cp up to about 4000 cp and preferably up to about 10 cp.

In accordance with the practice of the invention, dewatering treatment times may range from about 3 seconds to about 60 minutes and preferably from about one to about 10 minutes. When a combined dewatering and plasticizing bath is employed, the time generally required for the plasticizing treatment of a collagen structure such as a tubular food casing, e.g. between about 3 and 7 minutes, may be advantageously employed for the dewatering of such structure.

Exemplary of a preferred method of preparing a shaped collagen structure such as, for example, a tubular food casing, a collagen composition prepared as disclosed in U.S. Pat. No. 3,782,977 to Henderson et al, comprising at least about 6% by weight of collagen solids and having uniformly incorporated therein between about 5 and 30% by weight of non-collageneous fibers based on the weight of total dry solids, is pumped and metered through an extrusion nozzle to form a continuous tube of collagen, which tube is strong enough to support itself in a tubular configuration with a low pressure inflation air while being conveyed to and through a predryer. The partially dried collagen tubing is then collapsed between nip rolls, neutralized by passing through a dip tank containing very dilute ammonium hydroxide, washed by passing through water tanks, and then plasticized by being conveyed through a dilute aqueous glycerine solution. In accordance with the practice of the invention, the aqueous plasticization bath has incorporated therein a sodium alginate dewatering agent in an amount as herein described.

It has been found that wherein collagen tubing that has been conveyed through a glycerine plasticizer bath will generally have a moisture content of between about 75% by weight to about 85% by weight, the water content of collagen tubing conveyed through a plasticizer bath containing a proportion of sodium alginate dewatering agent in accordance with the practice of the invention will have a significantly lower moisture content, generally between about 55 to 67%.

The collagen tubing is then reinflated with low pressure air while maintaining the tubular configuration. If desired, the dried tubing may then be shirred into a shirred casing stick using methods well known in the art, or alternatively wound on a reel in flattened condition.

It has been found that when employing a sodium alginate dewatering treatment in accordance with the practice of the invention the line speed for processing collagen tubing including the drying thereof may be substantially increased without any change in drier capacity. For example, wherein a line speed for processing collagen tubing may be generally run at about 13.5 feet per minute, such tubing processed as herein described using an aqueous solution of sodium alginate as a dewatering treatment may be processed using the same equipment at a line speed of 18 feet per minute, or even faster.

Collagen tubing prepared in the manner herein described perform satisfactorily through each of the various processing steps with, in general, no problems being encountered. Moreover, it has been found that tubular collagen casings prepared in accordance with the practice of the invention, perform satisfactorily during shirring, stuffing, linking, and cooking operations.

Although, as shown herein, the use of sodium alginate in an aqueous solution serves as a dewatering agent for shaped collagen structures in the practice of the invention, the surprising fact is that products prepared from collagen compositions containing sodium alginate as an additive do not afford similar dewatering effects. It is known, as for example disclosed in U.S. Pat. Nos. 3,551,535 to Henderson et al and 3,695,902 to Shank, that salts of alginic acid may be used an an additive in preparing collagen compositions from which products such as tubular food casings may be prepared. Yet, if such products are processed using the conventional treatment solutions, the moisture content thereof will not be any lower than found with products prepared from compositions that do not contain sodium alginate, and the drying requirements therefore are not reduced.

The following examples are set forth as illustrating embodiments of the present invention and are not intended in any way to indicate the limits of the invention. Parts and percentages, unless otherwise indicated, are by weight. The term "wt %" as employed herein is intended to refer to weight percent.

In the examples which follow, dewatering was measured by weighing the collagen article before and after treatment with the dewatering agents. A "dewatering index" is used to rank dewatering efficiency which is defined as 100 times the collagen article weight after treatment divided by the collagen article weight before treatment. A low value for the "dewatering index" indicates effective dewatering, a "dewatering index" of 100 indicates no dewatering, and an "index" greater than 100 indicates swelling rather than dewatering.

EXAMPLE I

1630 Pounds of limed beef hide splits were chopped into approximately ⅛ to 2 inch pieces and subjected to an additional lime treatment by charging into a tank together with 57 pounds of lime and sufficient water to give a water to hide ratio of 3.9 to 1. The lime treatment was continued for 24 hours with intermittent agitation after which the limed hide chips were leached with approximately 10 gallons per minute of water for 20 hours. The hide chips were then swollen for 8 hours in a hydrochloric acid solution maintained at a pH of 1 using a flow rate of dilute acid of 10 gals/min. At the end of the acid swell treatment, the swollen chips were washed with water at 10 gals/min for about 5 hours until a wash water pH of 2.6 was reached. The chips were drained and chilled to about 1° C.

A cellulose fiber dispersion was prepared using the following ingredients:

| | |
|---|---|
| Collagen-composition | 254 pounds |
| Wood Cellulose Fibers | 155 pounds |
| Water | 2186 pounds |

The wood cellulose fibers used had an average fiber length of about 0.04 inch. Sheets of fibers were separated into convenient pieces, soaked in a portion of the water for about 60 minutes and then mixed for about 2 minutes, soaked for an additional 30 minutes, and then mixed for about 2 minutes. The rest of the ingredients were added to the mixer and the mixture was blended for about 165 minutes. The resulting wood cellulose fiber suspension was smooth, highly viscous, free of fiber clumps and had a composition of hide solids 1%, wood cellulose fibers 5.6% and water 93.4%.

A 210 pound collagen composition having a total solids of 11.1% was prepared having the following proportion of solid ingredients:

| | |
|---|---|
| Ground hide | 85% |
| Wood Cellulose Fibers | 15% |

Acid-swollen chips prepared as described above were ground in a meat grinder into pieces substantially between ⅛ and ½ inch in size prior to blending with the viscous cellulose fiber dispersion. The temperature during grinding of the chips was controlled so as not to exceed about 20° C.

The collagen composition was prepared by mixing 62.7 pounds of cellulose fiber dispersion, 126 pounds of ground acid-swollen chips having a solids content of 15.2%, and 21.1 pounds of water. The mixture was mixed for about 5 minutes at which time the composition was homogeneous and began to adhere to the mixing equipment. The temperature of the various materials during the mixing steps was controlled so as not to exceed 20° C.

After preparing the collagen composition, it was fed through a rotary-shear homogenizer by means of a screw extruder and pump. To prevent degradation of the collagen, the homogenizer rotor and stator were cooled with a coolant maintained at a temperature of about −5° C.

The homogenized blend was pumped through two parallel filters with 0.003 inch slots to break up any remaining collagen lumps and remove any nondispersed matter, and then was pumped and metered through an extrusion nozzle to form a continuous tube of collagen. The extruded tubing was inflated with low-pressure inflation air while being conveyed on horizontal rolls.

The inflated collagen tubing was partially dried and hardened by passing through a predryer at 50° C., then collapsed between nip rolls, neutralized by passing through a dip tank containing 0.06 N ammonium hydroxide, and washed by being conveyed through water tanks. After washing, the collapsed collagen tubing was conveyed through an aqueous plasticizer treatment bath containing 4.5% glycerol. Two lengths of the flattened tubing were treated by conveying through a glycerol bath to which 1 or 2% sodium alginate has been added. The sodium alginate used in this example was KELGIN RL, a product of Kelco Co., San Diego, Calif.

The tubing samples were then reinflated with low pressure air, dried in air at 100° C., moisturized in an equalizer at 70% RH and then shirred by passing through a shirring apparatus.

Prior to reinflating and drying, samples of the advancing collapsed tubing from each of the glycerol treatment baths were collected for 2 minutes and weighed and the results are shown in Table I. It will be noted from the tubing weights reported in Table I that the weight of the collapsed tubing treated in glycerol baths containing sodium alginate was less than that of the collapsed tubing that did not receive the sodium alginate treatment.

Observations were also made during drying of the inflated tubing. On drying completely, the casing changed from a milky opalescence to a clear translucence and the drier location where this transition occurred is also reported in Table I. Reinflated tubing samples that had been treated with sodium alginate were completely dried in a shorter length of drier than was the tubing that did not receive a sodium alginate treatment.

TABLE I

| Casing Sample | Sodium Alginate Treatment (% W/W) | Collapsed Tubing Weight (Grams Per 2 Minutes) | Length Of Drier Required For Drying (Feet) |
|---|---|---|---|
| A | 0 | 109.5 | 26 |
| B | 1.0 | 85.9 | 19 |
| C | 2.0 | 69.0 | 16.5 |

EXAMPLE II

Using the procedure of Example I, ground acid-swollen chips were prepared with the following differences: hide weight 1741 pounds, lime weight 122 pounds, water to hide ratio 3.6 to 1, lime time 57 hours, leach 9 hours at 10gpm water flow, wash 5 hours at 10gpm water flow.

A cellulose fiber dispersion was prepared as described in Example I. The resulting fiber dispersion was smooth, highly viscous, free of cellulose fiber clumps, and had a composition of collagen solids 1%, wood cellulose fibers 5.6%, and water 93.4%.

A 139 pound collagen composition was prepared as described in Example I by mixing 100 pounds of 12.7% ground acid-swollen chips and 39 pounds of cellulose fiber dispersion.

After preparing the collagen composition, collagen tubing was prepared and treated in dip baths as described in Example I with the final dip bath containing 4.5% glycerol and optionally 0 or 1% sodium alginate. The casing line speed was 13.5 feet per minute when the final dip bath did not contain sodium alginate and 18 feet per minute with 1% sodium alginate added to the final dip bath. The sodium alginate used in this example was KELGIN RL, a product of Kelco Co.

The tubing samples were then reinflated, dried, moisturized and shirred as described in Example I. As described in Example I, samples of collapsed tubing conveyed from the glycerol treatment bath were collected and weighed and the results are reported in Table II. Drying observations were also made and the results are shown in Table II.

TABLE II

| Sample | Sodium Alginate In Final Bath (% W/W) | Line Speed (FPM) | Collapsed Tubing Weight (gms/2 min) | Length Of Drier Required for Drying (Feet) |
|---|---|---|---|---|
| A | 0 | 13.5 | 73.3 | 27 |

TABLE II-continued

| Sample | Sodium Alginate In Final Bath (% W/W) | Line Speed (FPM) | Collapsed Tubing Weight (gms/2 min) | Length Of Drier Required for Drying (Feet) |
|---|---|---|---|---|
| B | 1.0 | 18 | 61.4 | 27 |

The results show that sodium alginate removed water from collapsed collagen tubing thereby permitting drying of reinflated tubing in 27 feet of drier at a faster line speed than was possible without the sodium alginate treatment.

EXAMPLE III

This example shows the effectiveness of aqueous treatment baths containing varying concentrations of sodium alginate.

Flattened collagen tubing prepared as described in Example I is collected after the final washing step and stored in frozen condition. Samples of thawed flattened tubing weighing about 10 gms are blotted thoroughly with a cloth towel to remove surface water and then weighed to the nearest 0.01 gms. Each of the samples of weighed tubing is treated for five minutes with agitation in an aqueous dip bath containing sodium alginate, the dip baths being prepared with various concentrations of the sodium alginate. The treated, flattened collagen tubing samples are then blotted and weighed. From the two weights, a "dewatering index" is calculated which equals 100 times the weight after treatment divided by the weight before treatment. The lower the "dewatering index," the more effective is the dewatering treatment. A summary of the results of this example are reported in Table III.

The sodium alginate materials used in this example are KELCOGEL LV, KELGIN RL, AND KELGIN XL, all of which are products of the Kelco Co. KELCOGEL LV is an especially-clarified, low-calcium, low viscosity grade of sodium alginate; KELGIN RL is a refined, special low viscosity grade of sodium alginate; and KELGIN XL is a refined, extra low viscosity grade of sodium alginate.

TABLE III

| Dewatering Agent | Dewatering Index At Indicated Concentration (Wt %) | | | | |
|---|---|---|---|---|---|
| | 0.5 | 1.0 | 1.5 | 2.0 | 3.0 |
| Sodium Alginate (KELCOGEL LV) | 82 | 70 | 56 | 52 | — |
| Sodium Alginate (KELGIN RL) | 85 | 78 | 72 | 68 | 65 |
| Sodium Alginate (KELGIN XL) | 92 | 85 | 75 | — | — |

EXAMPLE IV

Flattened collagen tubing prepared as described in Example I is collected after the final washing step and stored frozen for use in carrying out the evaluation tests of this example.

Samples of thawed, flattened collagen tubing weighing about 10 grams are blotted thoroughly with a cloth towel to remove surface water and then weighed to the nearest 0.01 grams. Samples of weighed collagen tubing are then treated in aqueous dip baths containing sodium alginate, with agitation, for varying lengths of time. After treatment, the tubing samples are blotted and weighed and the dewatering index is calculated.

The results of the dewatering treatment are summarized in Table IV. The sodium alginate used in this example is KELCOGEL LV and KELGIN RL.

TABLE IV

| Sodium Alginate | Dip Bath Concentration (% Wt.) | Treatment Time Minutes | Dewatering Index |
|---|---|---|---|
| KELCOGEL LV | 1.0 | .3 | 89 |
| " | 1.0 | 1.0 | 79 |
| " | 1.0 | 3.0 | 79 |
| " | 1.0 | 5.0 | 74 |
| " | 1.0 | 10.0 | 68 |
| " | 1.0 | 30.0 | 67 |
| " | 4.0 | 0.05 (3 secs) | 75 |
| " | 4.0 | 0.3 | 71 |
| " | 4.0 | 0.5 | 70 |
| " | 4.0 | 0.7 | 69 |
| " | 4.0 | 1.0 | 59 |
| KELGIN RL | 4.0 | 0.3 | 77 |
| " | 4.0 | 1.0 | 73 |
| " | 4.0 | 3.0 | 63 |
| " | 4.0 | 5.0 | 60 |
| " | 4.0 | 10.0 | 61 |
| " | 4.0 | 30.0 | 76 |

The results in Table IV show that treatment times as short as 3 seconds will afford appreciable dewatering and that dewatering is generally more effective when longer treatment times are used.

What is claimed is:

1. In a method of producting a shaped collagen structure the improvment comprises treating a shaped collagen structure prior to the final drying thereof with a dewatering solution comprising at least about 0.01% by weight of sodium alginate.

2. The method of claim 1, wherein said collagen structure is a tubular food casing.

3. The method of claim 1, wherein said dewatering solution is an aqueous solution.

4. The method of claim 2, wherein said dewatering solution is an aqueous solution and the treatment is carried out by immersing said food casing in said dewatering solution.

5. The method of claim 4, wherein said food casing is immersed in said dewatering solution for at least 3 seconds.

6. The method of claim 4, wherein said dewatering solution additionally comprises glycerine.

7. The method of claim 1 wherein said dewatering solution comprises up to about 10% by weight of sodium alginate.

8. The method of claim 6, wherein said food casing is immersed in said dewatering solution for between about 3 and 7 minutes.

9. The method of claim 1, wherein said collagen structure is dried after treating with said dewatering solution.

10. In a method of producing a shaped collagen structure, the improvement comprises treating a shaped collagen structure prior to the final drying thereof with a dewatering solution comprising a sufficient amount of sodium alginate for the dewatering index of the collagen structure to be less than 100.

11. The method of claim 10, wherein said dewatering solution is an aqueous solution.

12. The method of claim 10, wherein said shaped collagen structure is a tubular food casing.

13. The method of claim 12, wherein said dewatering solution is an aqueous solution and the treatment is carried out by immersing said food casing in said dewatering solution.

14. The method of claim 13, wherein said food casing is immersed in said dewatering solution for at least 3 seconds.

15. The method of claim 13, wherein said dewatering solution further comprises glycerine.

16. The method of claim 15 wherein said food is immersed in said dewatering solution for between about 3 and 7 minutes.

17. In a method of producing a shaped collagen structure, the improvement comprises treating a shaped collagen structure prior to the final drying thereof with a dewatering solution comprising at least about 0.5% by weight of sodium alginate.

18. The method of claim 17, wherein said dewatering solution is an aqueous solution.

19. The method of claim 17, wherein said shaped collagen structure is a tubular food casing.

20. The method of claim 19, wherein said dewatering solution is an aqueous solution and the treatment is carried out by immersing said food casing in said dewatering solution.

21. The method of claim 20, wherein said food casing is immersed in said dewatering solution for at least 3 seconds.

22. The method of claim 20, wherein said dewatering solution further comprises glycerine.

23. The method of claim 17, wherein said dewatering solution comprises up to about 10% by weight of sodium alginate.

24. The method of claim 22, wherein said food casing is immersed in said dewatering solution for between about 3 and 7 minutes.

* * * * *